(12) United States Patent
Yamaura et al.

(10) Patent No.: US 6,711,950 B1
(45) Date of Patent: Mar. 30, 2004

(54) LIQUID LEVEL DETECTOR

(75) Inventors: Takayuki Yamaura, Nagaoka (JP);
Tomoyuki Tanaka, Nagaoka (JP);
Akira Sakamaki, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 174 days.

(21) Appl. No.: 09/890,236

(22) PCT Filed: Nov. 22, 2000

(86) PCT No.: PCT/JP00/08261

§ 371 (c)(1),
(2), (4) Date: Jul. 30, 2001

(87) PCT Pub. No.: WO01/40740

PCT Pub. Date: Jun. 7, 2001

(30) Foreign Application Priority Data

Nov. 30, 1999 (JP) .............................. 11-339402
Apr. 21, 2000 (JP) .................................. 2000-126312

(51) Int. Cl.$^7$ ................................................ G01F 23/32
(52) U.S. Cl. ....................................... 73/317; 73/290 R
(58) Field of Search ............................ 73/290 R, 305, 73/317

(56) References Cited

U.S. PATENT DOCUMENTS 4,441,364 A * 4/1984 Montie ......................... 73/313
4,532,491 A 7/1985 Rau et al. ....................... 338/33
5,341,679 A * 8/1994 Walkowski et al. ............ 73/317
6,138,524 A 10/2000 Tsuda et al. ................. 73/866.5

FOREIGN PATENT DOCUMENTS

| JP | 60-193421 | 12/1985 |
| JP | 193421/1985 | 12/1985 |
| JP | 62-123522 | 8/1987 |
| JP | 123522/1987 | 8/1987 |
| JP | 5-2029 | 1/1993 |
| WO | WO99/28712 | 6/1999 |

* cited by examiner

Primary Examiner—Hezron Williams
Assistant Examiner—Rodney Frank
(74) Attorney, Agent, or Firm—McDermott, Will & Emery (57) ABSTRACT

There is provided a liquid level detecting apparatus capable of achieving miniaturization, which includes a float arm 2 provided with a float floating on a liquid surface, an arm holder 4 for holding the float arm 2 and provided with shaft portions 24 as rotation supporting points of the float arm 2, a main body frame 3 provided with two bearing portions 30 and 31 for axially supporting the shaft portions 24 of the arm holder 4, a circuit board 7 fixed to the main body frame 3, and a contact holding member 5 provided with a sliding contact 6 sliding on the circuit board 7 and fixed to the arm holder 4, and the arm holder 4 is positioned between the bearing portions 30 and 31 and holds the float arm 2 and the contact holding member 5.

15 Claims, 9 Drawing Sheets

LIQUID LEVEL DETECTOR

TECHNICAL FIELD

The present invention relates to a liquid level detecting apparatus, and particularly has a feature in miniaturization of a liquid level detecting apparatus.

BACKGROUND OF THE INVENTION

Figure 13:
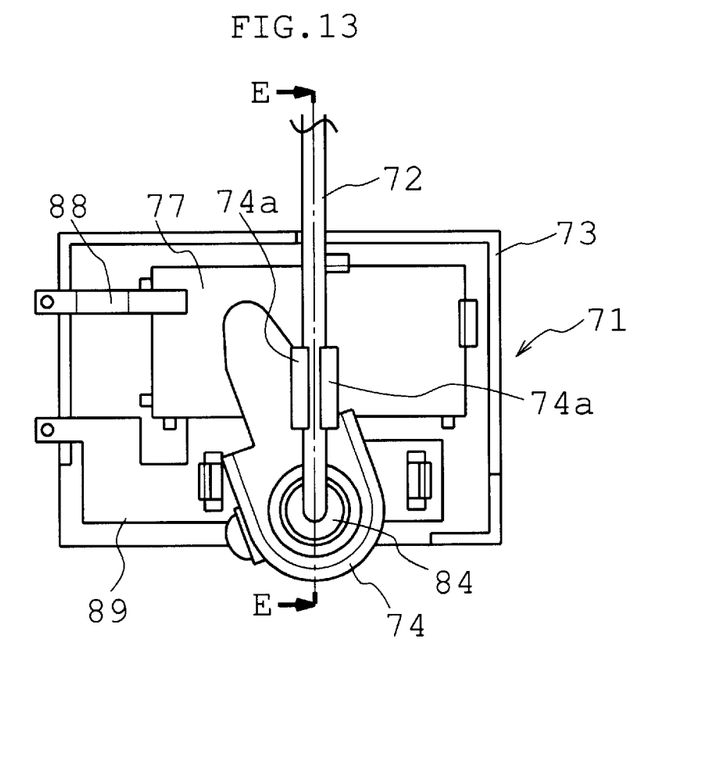
FIG. 13 is a top view of the prior art.
Figure 14:
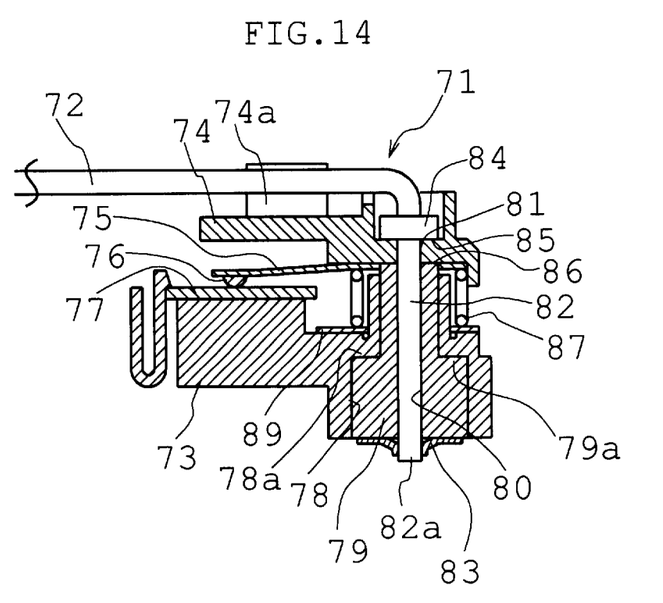
FIG. 14 is a sectional view along line E—E in FIG. 13.

A conventional liquid level detecting apparatus 71 is disclosed in Japanese Utility Model Laid-Open No. 2029/1993, and as shown in FIG. 13 and FIG. 14, a float arm 72 having a tip end at which a not shown float moving according to variation of a liquid level is provided, is rotatably supported in a main body frame 73. The float arm 72 is rotatably supported in the main body frame 73 through an arm holder 74.

A contact holding member 75 is fixed to the arm holder 74, and a sliding contact 76 is protrusively provided at the tip end of the contact holding member 75. A pair of holding pieces 74a are formed at the arm holder 74 in order to position the float arm 72 and the contact holding member 75 held by the arm holder 74, the opposing surfaces of the holding pieces 74a are formed into arc surfaces to conform to the outer shape of the float arm 72, the float arm 72 is press inserted into the arc surfaces from an upper opening portion of the holding pieces 74a while spreading the holding pieces 74a, and a structure is realized in which the float arm 72 does not come out toward the upper portion by elastic restoring force of the holding pieces 74a.

The sliding contact 76 slides on a circuit board 77 provided in the main body frame 73 and made of ceramic at a predetermined contact pressure.

The circuit board 77 is provided, on its surface, with a not-shown band-like resistor and a not-shown comb electrode arranged into a band along the band-like resistor, the sliding contact 76 is made to slide on and come in contact with the comb electrode at the predetermined contact pressure, and a current variation corresponding to the quantity of varying resistance between the sliding contact 76 and the base end of the resistor is outputted, so that the liquid quantity is detected.

In the liquid level detecting apparatus 71 like this, a bearing structure of the float arm 72 is such that a bearing fit portion 78 is formed in the main body frame 73, a two-stage cylindrical bearing member 79 having different diameters is rotatably fitted in the bearing fit portion 78, an end portion 82 of the float arm 72 bent into an L shape in a substantially rectangular direction is inserted to pass through a shaft hole 80 provided in the bearing member 79 and a shaft hole 81 provided in the base portion of the arm holder 74, a push nut as a falling out preventing member 83 is press fitted to a through end portion 82a of the end portion 82 protruding from the lower surface of the bearing member 79, and the float arm 72 is pulled downwardly from the bearing member 79 by the press fitting of the push nut 83 and is clamped.

A receiving surface 85 for receiving a flange engagement portion 84 formed by header working at the outer periphery of the middle of the end portion 82 of the float arm 72 is formed at a hole fringe portion of the shaft hole 81 of the arm holder 74, and a contact surface 86 is formed at a position where the main body frame 73 is in contact with the bearing member 79. The arm holder 74 receives the engagement portion 84 of the float arm 72 at the receiving surface 85, and the float arm 72, the arm holder 74, and the contact holding member 75 are fitted to one another so that they do not rattle. Accordingly, when the push nut 83 is fastened, the bearing member 79 is fixed in a state where it is fastened by both the arm holder 74 and the push nut 83, and a structure is realized in which the float arm 72 and the bearing member 79 are rotated together. An upward force is always applied to the arm holder 74 by a coil spring 87 electrically connected to the contact holding member 75. A stepped portion 78a of the bearing fit portion 78 and a stepped portion 79a of the bearing member 79 receive the upward force of the coil spring 87, and the float arm 72, together with the bearing member 79, does not come out toward the upside. Since the bearing member 79 protrudes from the main body frame 73 to come in contact with the arm holder 74, and the main body frame 73 is separate from the arm holder 74, the combination of the float arm 72, the arm holder 74 and the bearing member 79 is rotated relative to the main body frame 73.

Incidentally, reference numerals 88 and 89 designate terminals, the one terminal 88 is connected to the circuit board 77, and the other terminal 89 is connected to the contact holding member 75 through the coil spring 87.

In recent years, the liquid level detecting apparatus 71 installed in a not-shown fuel tank, a fuel pump and the like are installed as a combined unit in the fuel tank. From a problem of fitting caused from the formation of the unit and so on, the liquid level detecting apparatus 71 is also desired to be miniaturized. Then, an object is to provide a liquid level detecting apparatus which can achieve miniaturization.

DISCLOSURE OF THE INVENTION

A liquid level detecting apparatus of the present invention comprises a float arm provided with a float floating on a liquid surface, an arm holder for holding the float arm and provided with shaft portions as rotation supporting points of the float arm, a main body frame provided with two bearing portions for axially supporting the shaft portions of the arm holder, a circuit board fixed to the main body frame, and a contact holding member provided with a sliding contact sliding on the circuit board and fixed to the arm holder, and the arm holder is positioned between the bearing portions and holds the float arm and the contact holding member. By the structure like this, the liquid level detecting apparatus capable of achieving miniaturization can be provided. Besides, the shaft portions are supported by the two portions of the bearing portions, so that it is possible to provided the liquid level detecting apparatus which is small and in which the axes of the shaft portions are hard to shift.

Besides, a liquid level detecting apparatus comprises a float arm provided with a float floating on a liquid surface, an arm holder for holding the float arm and provided with shaft portions as rotation supporting points of the float arm, a main body frame for axially supporting the shaft portions of the arm holder, a circuit board fixed to the main body frame, and a contact holding member provided with a sliding contact sliding on the circuit board and fixed to the arm holder, in which the two separate shaft portions are provided at the arm holder, two bearing portions for axially supporting the two shaft portions are provided at the main body frame, and the arm holder holding the front arm and the contact holding member is provided between the bearing portions. By the structure like this, the liquid level detecting apparatus,capable of achieving miniaturization can be provided. Besides, the shaft portions are supported at two places of the bearing portions, so that it is possible to provided the liquid level detecting apparatus which is small and the axes of the shaft portions are hard to shift.

Besides, a liquid level detecting apparatus comprises a float arm provided with a float floating on a liquid surface, an arm holder for holding the float arm and provided with shaft portions as rotation supporting points of the float arm, a first frame constituting a main body frame and provided with a first bearing portion for axially supporting the shaft portion of the arm holder, a second frame constituting the main body frame and provided with a second bearing portion for axially supporting the shaft portion of the arm holder, a circuit board fixed to the first frame, and a contact holding member including a sliding contact sliding on the circuit board and fixed to the arm holder, the arm holder is held by the first and the second frames, and the first and the second frames are fixed. By the structure like this, as compared with the prior art, a holding method of the arm holder is changed, and the number of parts is reduced, so that the liquid level detecting apparatus capable of achieving miniaturization can be provided. Besides, the shaft portions are supported at the two places of the first and the second bearing portions, so that it is possible to provide the liquid level detecting apparatus which is small and in which the axes of the shaft portions are hard to shift.

Besides, a liquid level detecting apparatus comprises a float arm provided with a float floating on a liquid surface, an arm holder for holding the float arm and provided with shaft portions as rotation supporting points of the float arm, a main body frame for axially supporting the shaft portions of the arm holder, a circuit board fixed to the main body frame, and a contact holding member provided with a sliding contact sliding on the circuit board and fixed to the arm holder, in which the two separate shaft portions are provided at the arm holder, the main body frame is formed of a first frame and a second frame, the circuit board is fixed to the first frame which is provided with a first bearing portion for axially supporting the shaft portion of the arm holder, the second frame is provided with a second bearing portion for axially supporting the shaft portion of the arm holder, the arm holder is held by the first and the second frames, and the first and the second frames are fixed. By the structure like this, as compared with the prior art, a holding method of the arm holder is changed, and the number of parts is reduced, so that the liquid level detecting apparatus capable of achieving miniaturization can be provided. Besides, the shaft portions are supported at the two places of the first and the second bearing portions, so that it is possible to provide the liquid level detecting apparatus which is small and in which the axes of the shaft portions are hard to shift.

Besides, the first and the second frames are fixed by welding. By the structure like this, it is possible to provide the liquid level detecting apparatus in which the first and the second frames can be fitted to each other more firmly.

Besides, a holding arm piece formed to extend in a direction vertical to the axial direction is formed between the shaft portions of the arm holder, and the float arm and the contact holding member are held by the holding arm piece. By the structure like this, it is possible to provide the liquid level detecting apparatus in which the float arm and the contact holding member can be easily fixed and the fitting work is excellent.

Besides, a bent portion is provided at which an end portion of the float arm is bent in a direction intersecting with the shaft portions, and the arm holder is provided with a holding portion for rotatably holding the end portion and a holding piece for preventing rotation of the float arm. By the structure like this, it is possible to provide the liquid level detecting apparatus in which fitting of the float arm to the arm holder can be easily made.

Besides, a bending direction of the end portion is substantially orthogonal to the axial direction of the shaft portions. By the structure like this, the distance between the bearing portions can be made short, and the smaller liquid level detecting apparatus can be provided.

Besides, the main body frame is provided with a guide portion for suppressing movement of the float arm in a rotation axis direction. By the structure like this, it is possible to provide the liquid level detecting apparatus in which the movement of the arm holder in the rotation axis direction can be suppressed, the float arm can be easily fitted to the arm holder, and it does not easily come off.

Besides, a concave-convex fit portion is provided near the first and the second bearing portions of the first and the second frames. By the structure like this, a construction is obtained in which the axial centers of the bearing portions are hard to shift, and it is possible to provide the liquid level detecting apparatus in which the arm holder smoothly moves.

Besides, a rotation regulating portion for regulating a rotation range of the float arm is provided at at least one of the first and the second frames, and a weld fixing portion for welding the first and the second frames is provided near the rotation regulating portion. By the structure like this, it is possible to provide the liquid level detecting apparatus which can prevent the first and the second frames from coming out by the movement of the float arm in a direction other than the sliding direction caused by liquid level variation.

Besides, the weld fixing portion is a positioning member for determining a positional relation of the first and the second frames. By the structure like this, the positioning member and the weld fixing portion are formed at the same portion, so that the further small liquid level detecting apparatus can be provided.

Besides, a reinforcing rib is provided at a rear surface of the second frame. By the structure like this, the rigidity of the second frame is raised, and the small and strong liquid level detecting apparatus can be provided.

BRIEF DESCRIPTION OF THE DRAWINGS

FIG. 1 to FIG. 4 show a first embodiment of the present invention,

FIG. 5 to FIG. 12 show a second embodiment of the present invention,

BEST MODE FOR CARRYING OUT THE INVENTION

Hereinafter, the present invention will be described with reference to the drawings. FIG. 1 to FIG. 4 show a first embodiment of the present invention.

A liquid level detecting apparatus 1 of the present invention includes a float arm 2 interlocking with a not-shown float floating on the liquid surface of a not-shown fuel tank, an arm holder 4 moving in accordance with the rotation of the float arm 2, a main body frame 3 for rotatably supporting the arm holder 4, a circuit board 7 fixed to the main body frame 3, a contact holding member 5 provided with a sliding contact 6 sliding on the circuit board 7 and fixed to the arm holder 4, a terminal 20 electrically connected to the circuit board 7, and a lead line 21 for connecting the terminal 20 and a not-shown external circuit, and the sliding contact 6 slides on the circuit board 7 through the float, the float arm 2, the arm holder 4 in accordance with variation of the liquid level, so that a voltage variation produced by a not-shown resistor provided on the circuit board 7 is outputted to the not-shown external circuit through the lead line 21.

The float arm 2 is a metal rod, and the not-shown float floating on the liquid surface is provided at its tip end. The other end portion 12 is bent.

The arm holder 4 is made of synthetic resin, is provided with a holding portion 23 having a hole 22 through which the bent end portion 12 of the float arm 2 passes, and is provided with holding pieces 4a for holding the float arm 2 at both sides. The float arm 2 is positioned and fixed to the arm holder 4 by the holding member 23 and the holding pieces 4a.

Two shaft portions 24 spaced in position are provided at both sides of a barrel portion 26, the shaft portions 24 are formed to be positioned on the same axis at the arm holder 4 and at both its ends, and the barrel portion 26 and the shaft portions 24 have cylindrical shapes provided with a through hole 27 at the center portions. This shaft portions 24 are rotation supporting points of the float arm 2. Further, a contact holding member 5 provided with two sliding contacts 6 sliding on the circuit board 7 is fixed to the arm holder 4. The contact holding member 5 and the sliding contacts 6 are made of metal, the sliding contacts 6 are fixed to the contact holding member 5 by caulking, and the contact holding member 5 is fixed to the arm holder 4 through a thermal weld portion 4b.

The float arm 2 is fitted to the arm holder 4 in such a manner that the end portion 12 of the float arm 2 is inserted into the holding portion 23, it is rotated in an axial direction of the shaft portions 24 around an axis of the end portion 12 rotatably held by the holding portion 23, and the holding pieces 4a of the arm holder 4 are elastically deformed to hold the float arm 2, so that the rotation of the float arm 2 is prevented. By the fitting as described above, the float arm 2 can be easily fitted to the arm holder 4.

Incidentally, although the angle of the bent portion 12b of the float arm 2 is a right angle in this embodiment, the invention is not limited to this embodiment, but it may be bent at any angle as long as it is bent.

Incidentally, in this embodiment, the axial direction of the bent end portion 12 is set to be substantially orthogonal to the axial direction of the shaft portions 24.

The float arm 2 and the contact holding member 5 are fixed to a holding arm piece 25 protrusively formed at the barrel 26 between the shaft portions 24 of the arm holder 4. The holding arm piece 25 protrudes in a direction vertical to the axial direction of the shaft portions 24. Incidentally, the float arm 2 and the contact holding member 5 including the sliding contacts 6 are positioned inside of lines L1 and L2 (see FIG. 2) intersecting with the end faces of the respective shaft portions 24 in the vertical direction. Incidentally, a portion of the float arm 2 exposed from an after-mentioned guide portion 43 of the main body frame 3 may be positioned outside of the lines L1 and L2.

The main body frame 3 is also made of synthetic resin, and is constituted by an upper frame 28 as a second frame and a lower frame 29 as a first frame. The upper and the lower frames 28 and 29 are respectively provided with bearing portions 30 and 31 for receiving the shaft portions 24 of the arm holder 4, so that the arm holder 4 is rotatably supported. The holding arm piece 25 of the arm holder 4 provided with the float arm 2 and the contact holding member 5 is positioned between the bearing portions 30 and 31.

Four elastic pieces 33 having engagement pawls 32 are provided at the upper frame 28, and similarly, four engagement portions 34 engaging with the engagement pawls 32 are provided at the lower frame 29. Besides, two pins 35 are protrusively formed at the lower frame 29, and holes 36 through which the pins 35 pass are provided at the upper frame 28. Incidentally, the pin 35 passes through the hole 36, and has such a length that the end portion is exposed from the upper frame 28. The fitting and fixing of the upper and the lower frames 28 ad 29 is completed by engaging the engagement pawls 32 and the engagement portions 34 provided at the upper and the lower frames 28 and 29, and by deforming the end portions of the pins 35 exposed from the holes 36 through thermal welding.

A pin 37 and a hole 38 provided in the vicinity of the bearing portions 30 and 31 constitute a concave-convex fit portion, the pin 37 is provided at the lower frame 29 and is inserted in the hole 38 of the upper frame 28 so that the frames 28 and 29 are positioned, and it is provided in the vicinity of the bearing portions 30 and 31 so that the axial centers of the bearing portions 30 and 31 are not shifted.

Incidentally, reference numeral 39 designates a window provided in the upper frame 28, and part of the float arm 2 and the arm holder 4 are exposed.

The lower frame 29 is provided with a notch 40 in which part thereof is cut off. Contact portions 41 and 42 which comes in contact with the float arm 2 and for regulating a rotation range are provided at both ends of the notch 40. Incidentally, not the float arm 2 but the arm holder 4 may come in contact with the contact portions 41 and 42 to regulate the rotation range. The notch 40 constitute the guide portion 43 in the state where the upper frame 28 and the lower frame 29 are fitted to each other. Since the movement of the float arm 2 in the rotation axial direction is suppressed by the guide portion 43, it is possible to prevent the float arm 2 from coming off the holding pieces 4a.

The circuit board 7 is made of ceramic, and is provided with a conductor 44 and a not-shown resistor on its surface. This circuit board 7 is fixed to the lower frame 29. The lower frame 29 is provided with a recess portion 45 for housing the circuit board 7, and is provided with elastic pieces 48 and 49 having engagement pawls 46 and 47 respectively engaged with the opposing sides of the rectangular circuit board 7. The circuit board 7 is pressed toward side walls 50 and 51 constituting the recess portion 45 by the elastic pieces 48 and 49 having the engagement pawls 46 and 47 and is fixed.

The terminal 20 is made of metal, and is formed by bending and processing a plate-like member. The terminal 20 is provided with a contact piece 20a having elasticity and coming in contact with a not-shown land of the circuit board 7. The tip end of the contact piece 20a has such a structure that it branches out into two portions and certainly comes in contact with the circuit board 7 at two points. The terminal 20 is provided with a spring piece 20b which comes in contact with the contact piece 20a deformed when the contact piece 20a comes in contact with the circuit board 7 and presses it toward the side of the circuit board 7. The spring piece 20b has a wound shape and has a spring property. By this, a high contact pressure to the circuit board 7 can be obtained, and lowering of the contact pressure due to aging can also be prevented.

Besides, a groove portion 20c for insertion holding the end portion of the circuit board 7 is provided at the side, and is provided so that the circuit board 7 is positioned and the contact piece 20a is certainly connected to the circuit board 7.

Reference numeral 20d designates a stopper for preventing falling out the main body frame 3, which is engaged by an engagement portion 52 provided at the lower frame 29, and prevents the terminal 20 connected to the circuit board 7 from falling out. Reference numeral 20e designates a first fixing portion for fixing a portion of a conductive line 21a of the lead line 21 and for making electrical connection to the terminal 20, 20f designates a second fixing portion for fixing a covering portion 21b of the lead line 21, and both the first and the second fixing portions 20e and 20f are deformed and are fixed. By the structure like this, the terminal 20 is connected to the not-shown external circuit, and the terminal 20 and the lead line 21 can be electrically connected to each other without using solder.

Figure 1:
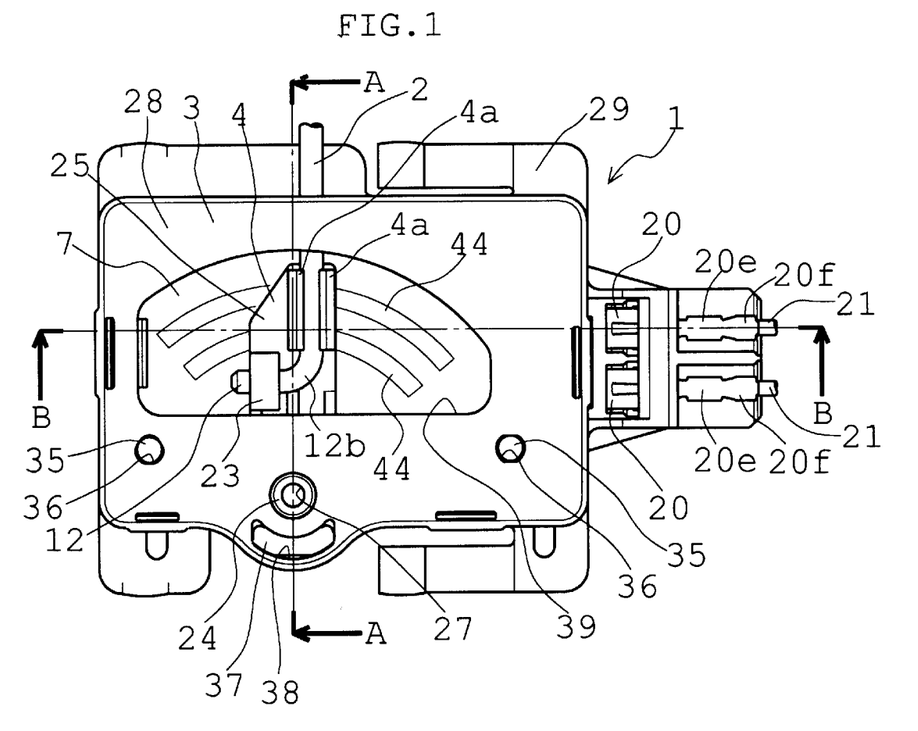
FIG.1 is a top view of the first embodiment of the present invention.
Figure 2:
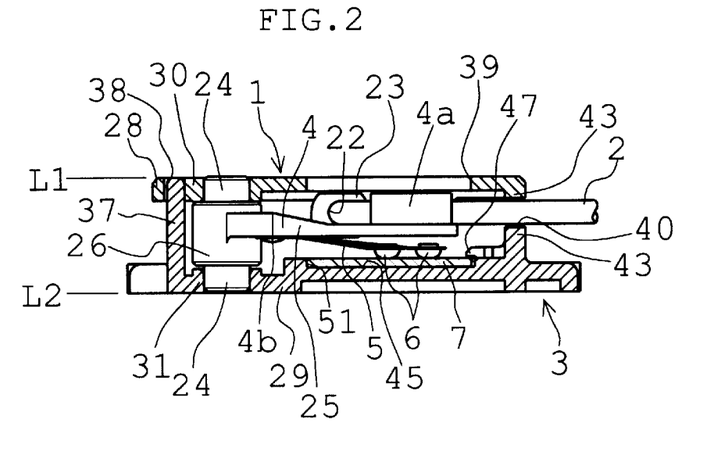
FIG. 2 is a sectional view along line A—A in FIG. 1.
Figure 3:
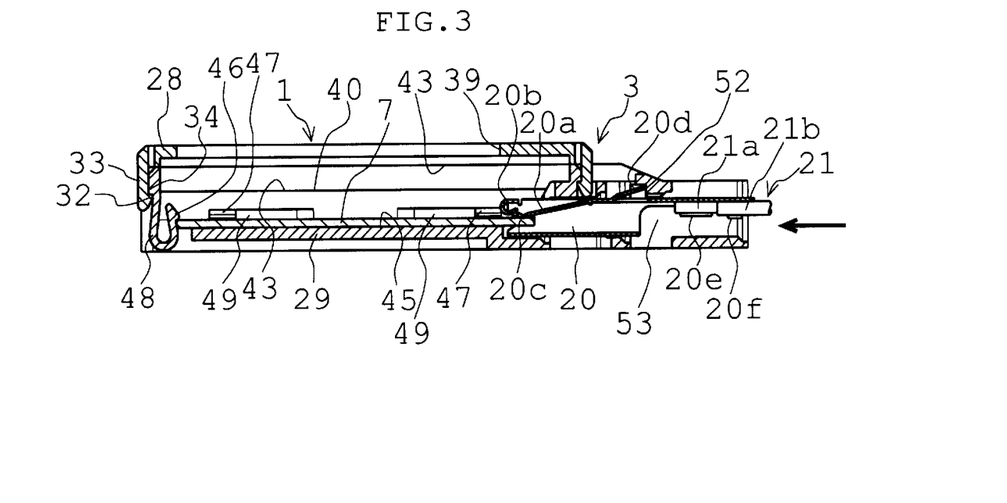
FIG. 3 is a sectional view along line B—B in FIG. 1.
Figure 4:
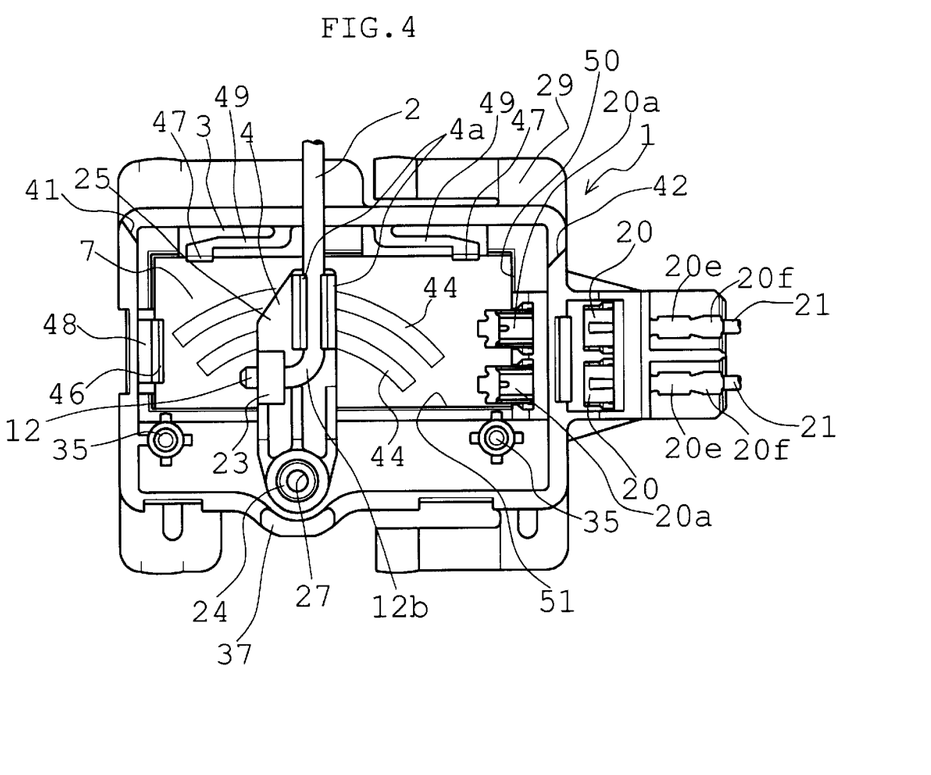
FIG. 4 is a top view of a state in which an upper frame of the embodiment is taken off.
Figure 5:
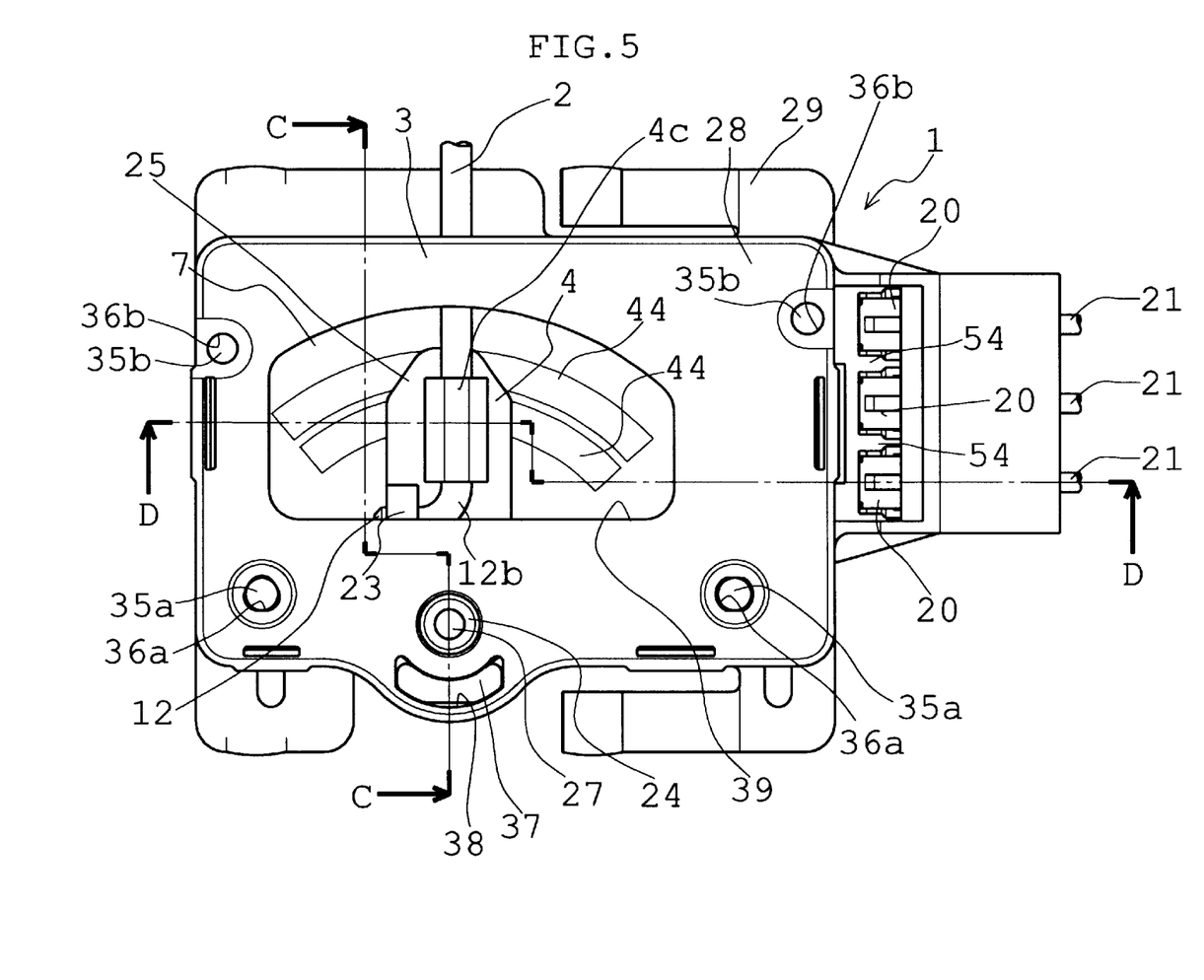
FIG. 5 is a top view of the second embodiment of the present invention.

In the connection of the terminal 20 and the circuit board 7, the circuit board 7 is previously mounted in the main body frame 3, and the terminal 20 is inserted in the terminal housing portion 53 provided in the main body frame 3 in the direction of an arrow in FIG. 3. By this, the connection can be easily made without using solder, the labor of working can be reduced, and the inexpensive liquid level detecting apparatus can be provided.

By the above structure, the bearing portions 30 and 31 for receiving the shaft portions 24 are provided in the upper and the lower frames 28 and 29, and the float arm 2 and the contact holding member 5 are arranged between the bearing portions 30 and 31, so that the thin type liquid level detecting apparatus 1 as compared with the prior art can be provided. Besides, the shaft portions 24 are separately provided, and both sides are held by the bearing portions 30 and 31, so that it is possible to obtain such an effect that the rotation center of the rotation axis of the arm holder 4 is hard to shift.

Besides, in this embodiment, since the axial direction of the bent end portion 12 is set so that it intersects with the axial direction of the shaft portions 24 substantially at right angles, the distance between the bearing portions 30 and 31 can be shortened, and the further thin type liquid level detecting apparatus can be provided. Incidentally, any angle may be set as long as the axial direction of the end portion 12 intersects with the axial direction of the shaft portions 24.

Next, a second embodiment of the present invention will be described with reference to the drawings. FIG. 5 to FIG. 12 shows the second embodiment of the present invention. Incidentally, the same and like portions as those of the first embodiment are designated by the same characters and the detailed description is omitted.

A liquid level detecting apparatus 1 of the present invention includes a float arm 2 interlocking with a not-shown float floating on the liquid surface of a not-shown fuel tank, an arm holder 4 moving in accordance with the rotation of the float arm 2, a main body frame 3 for rotatably supporting the arm holder 4, a circuit board 7 fixed to the main body frame 3, a contact holding member 9 provided with sliding contacts 8 sliding on the circuit board 7 and fixed to the arm holder 4, a terminal 20 electrically connected to the circuit board 7, and a lead line 21 for connecting the terminal 20 and a not-shown external circuit, and the sliding contacts 8 slide on the circuit board 7 through the float, the float arm 2, and the arm holder 4 in accordance with the variation of the liquid level, so that a voltage variation produced by a not-shown resistor provided on the circuit board 7 is outputted to the not-shown external circuit through the lead line 21.

The arm holder 4 is made of synthetic resin, is provided with a holding portion 23 having a hole 22 through which a bent end portion 12 of the float arm 2 passes, and is provided with a holding piece 4c having a C-shaped sectional shape for holding the float arm 2. The holding piece 4c is open in the horizontal direction. The float arm 2 is positioned and is fixed to the arm holder 4 by the holding member 23 and the holding piece 4c.

The contact holding member 9 provided with the two sets of sliding contacts 8 sliding on the circuit board 7, each set including three contacts, is fixed to the arm holder 4. The contact holding member 9 and the sliding contacts 8 are made of metal, the sliding contacts 8 are formed by press working to the contact holding member 9, and the contact holding member 9 is fixed to the arm holder 4 through a thermal weld portion 4b.

The float arm 2 and the contact holding member 9 are fixed to a holding arm piece 25 protrusively formed at a barrel 26 between shaft portions 24 of the arm holder 4. The holding arm piece 25 protrudes in the direction vertical to the axial direction of the shaft portions 24.

Figure 11:
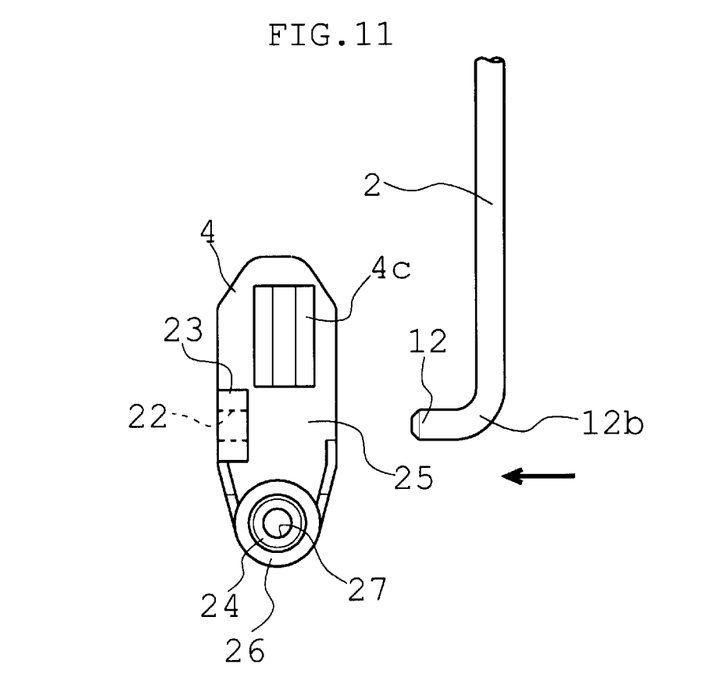
FIG. 11 is a top view of a float arm and an arm holder of the embodiment.
Figure 12:
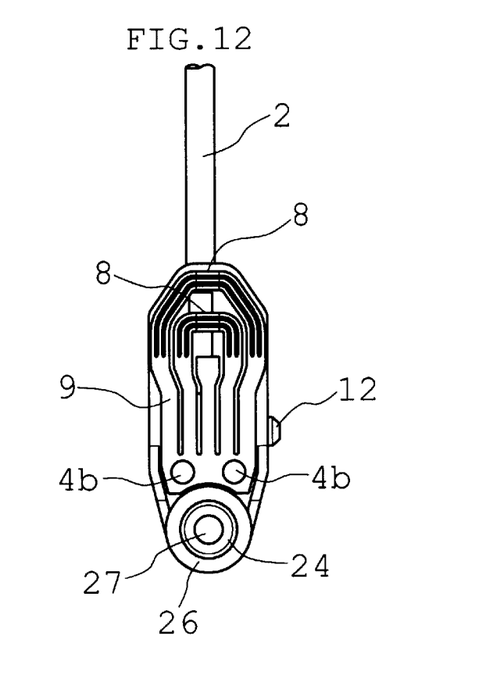
FIG. 12 is a rear view of the float arm and the arm holder of the embodiment.

The fitting of the float arm 2 to the arm holder 4 is carried out such that as shown in FIG. 11, the float arm 2 is fitted to the arm holder 4 in the direction of an arrow. That is, the end portion 12 of the float arm 2 is inserted in the hole 22 of the holding portion 23, and at the same time, the holding piece 4c of the arm holder 4 is elastically deformed, and the float arm 2 is fitted to the arm holder 4. By the fitting as described above, the float arm 2 can be easily fitted to the arm holder 4.

Incidentally, in this embodiment, the axial direction of the bent end portion 12 intersects with the axial direction of the shaft portions 24 substantially at right angles.

Figure 6:
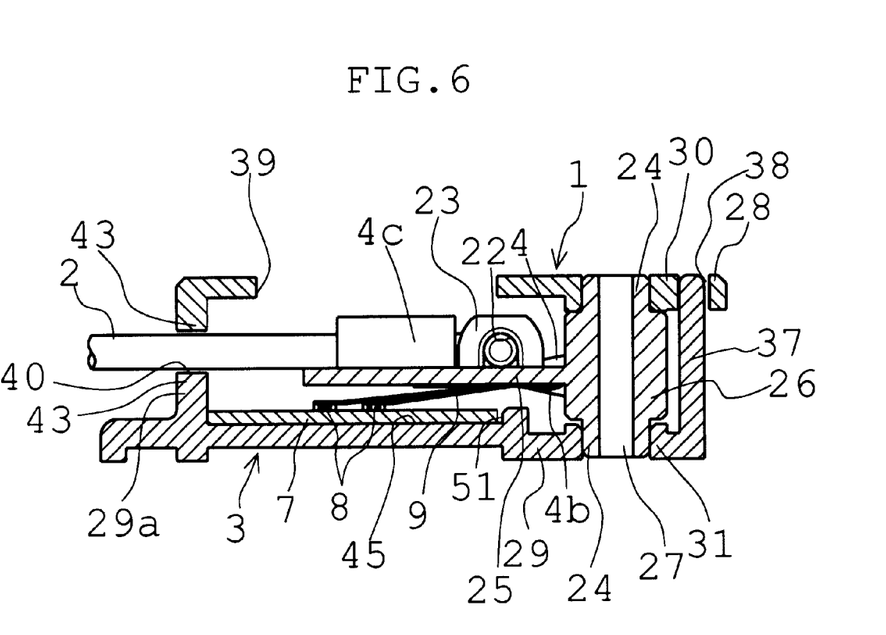
FIG. 6 is a sectional view along line C—C in FIG. 5.
Figure 9:
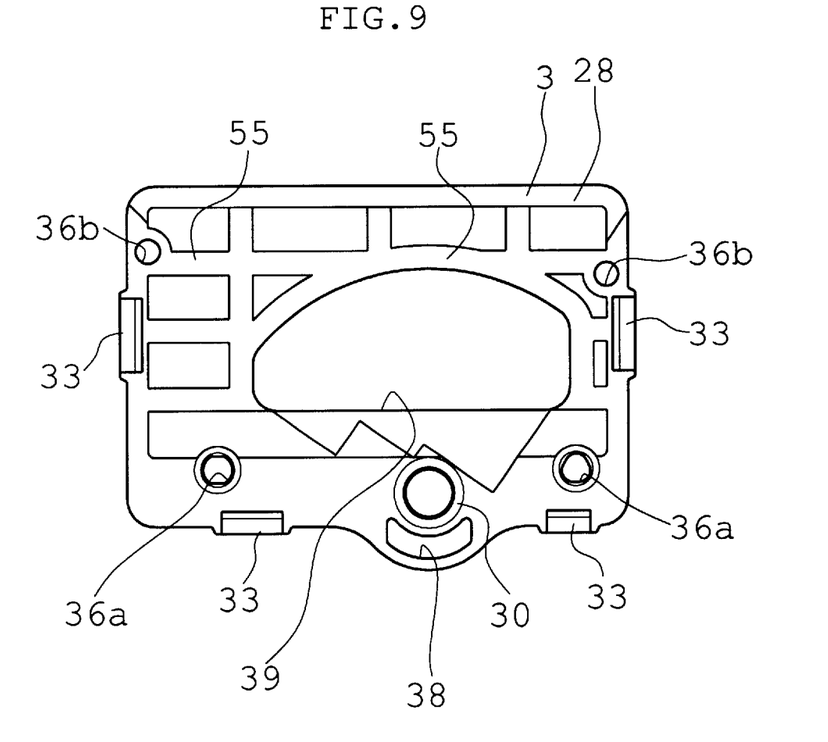
FIG. 9 is a rear view of the upper frame of the embodiment.
Figure 10:
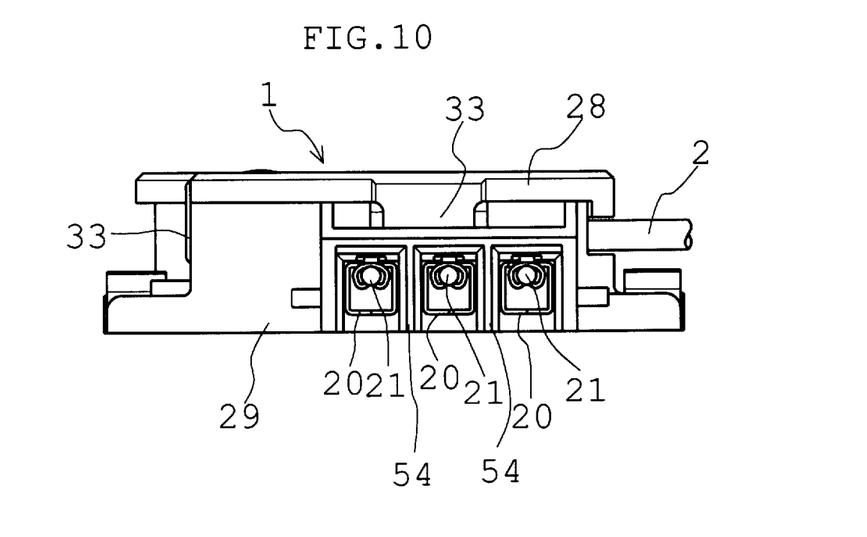
FIG. 10 is a side view of the embodiment.

The main body frame 3 is also made of synthetic resin, and is constituted by an upper frame 28 as a second frame and a lower frame 29 as a first frame. The upper frame 28 has a flat plate shape and is provided with a window 39, and part of the float arm 2 and the arm holder 4 are exposed. Besides, as shown in FIG. 9, the rear surface is provided with a rib 55 at a part of the periphery of the window 39 and a part of the rear surface. The rib 55 is formed into a grid except for a part of the periphery of the window 39. The lower frame 29 is provided with a bottom surrounded by walls for housing the circuit board 7, and has a box shape in which an upper portion in FIG. 6 is open. The upper and the lower frames 28 and 29 are respectively provided with first and second bearing portions 31 and 30 for receiving the shaft portions 24 of the arm holder 4, so that the arm holder 4 is rotatably supported. The holding arm piece 25 of the arm holder 4 provided with the float arm 2 and the contact holding member 9 is positioned between the bearing portions 30 and 31.

Four elastic pieces 33 having engagement pawls 32 are provided at the upper frame 28, and similarly, four engagement portions 34 engaging with the engagement pawls 32 are provided at the lower frame 29. Besides, four pins 35a and 35b are protrusively formed at the lower frame 29, and holes 36a and 36b through which the pins 35a and 35b pass are provided at the upper frame 28. Incidentally, the pins 35a and 35b pass through the holes 36a and 36b, and have such lengths that the end portions are exposed from the upper frame 28. The pins 35a and 35b are inserted in the holes 36a and 36b, and then, are welded and fixed at weld fixing portions.

Besides, the pins 35a and the holes 36a serve also as positioning members. Thus, since they are used as both the positioning members and the weld fixing portions as fixing means, it is not necessary to separately provide the positioning members and the weld fixing portions, and the upper and the lower frames 28 and 29 can be made further compact. Incidentally, the pins 35b and the holes 36b are provided in the vicinity of after-mentioned contact portions 41 and 42.

The engagement pawls 32 and the engagement portions 34 provided at the upper and the lower frames 28 and 29 are engaged and are temporarily fixed, and the end portions of the pins 35a and 35b exposed from the holes 36a and 36b are deformed by thermal welding, so that fitting and fixing of the upper and the lower frames 28 and 29 is completed. Incidentally, in this embodiment, although the pins 35a and 35b are fixed by welding, they may be fixed by only the engagement of the engagement pawls 32 and the engagement portions 34. In this case, the welding work can be omitted, and manufacturing costs can be reduced.

A pin 37 and a hole 38 provided in the vicinity of the bearing portions 30 and 31 constitutes a concave-convex fit portion, the pin 37 is provided at the lower frame 29 and is inserted in the hole 38 of the upper frame 28 to position the frames 28 and 29, and it is provided in the vicinity of the bearing portions 30 and 31 to prevent the axial centers of the bearing portions 30 and 31 from shifting.

The lower frame 29 is provided with a notch 40 in which a part of a wall (upper wall in FIG. 8) 29a surrounding the periphery of the circuit board 7 is cut off. Contact portions 41 and 42 which comes in contact with the float arm 2 and regulates a rotation range are provided at both ends of the notch 40. Incidentally, not the float arm 2 but the arm holder 4 may come in contact with the contact portions 41 and 42 to regulate the rotation range. The notch 40 constitutes the guide portion 43 in the state where the upper frame 28 and the lower frame 29 are fitted to each other. By the guide portion 43, the rotation of the float arm 2 in the rotation axial direction can be suppressed. Besides, as described above, the pins 35b and the holes 36b are provided in the vicinity of the contact portions 41 and 42. Thus, even if the float is moved by the variation of the liquid level, the float arm 2 is moved in the rotation axial direction to collide with the guide portion 43, and force is applied to the upper and the lower frames 28 and 29, since the pins 35b and 36b constituting the weld fixing portions are provided in the vicinity of the contact portions 41 and 42, the rigidity of the upper and the lower frames 28 and 29 is raised, and a strong frame structure can be obtained in which the engagement of the engagement pawl 32 and the engagement portion 34 does not come off.

The circuit board 7 is made of ceramic, and is provided with a conductor 44 arranged like a comb and a not-shown resistor on its surface. This circuit board 7 is fixed to the lower frame 29. The lower frame 29 is provided with a recess portion 45 for housing the circuit board 7, and is provided with elastic pieces 48 and 49 having engagement pawls 46 and 47 respectively engaging with the opposing sides of the rectangular circuit board 7. The circuit board 7 is pressed to the side of a protrusion 56 by the elastic pieces 48 and 49 provided with the engagement pawls 46 and 47 and is fixed. The position where the elastic piece 48 provided with the engagement pawl 46 is provided is made the same as the position of the elastic piece 33 provided with the engagement pawl 32 for fixing the upper and the lower frames 28 and 29 and the engagement position 34, so that the elastic piece 48 is assisted by the elasticity of the elastic piece 33 of the upper frame 28, and the circuit board 7 can be held more firmly.

Separation walls 54 are provided between the terminals 20 at the lower frame 29 so that the terminals 20 do not come in contact with each other. A terminal housing portion 53 is formed by the separation walls 54. Besides, the separation walls 54 function as guide members when the terminals 20 are attached to the lower frame 29.

Figure 7:
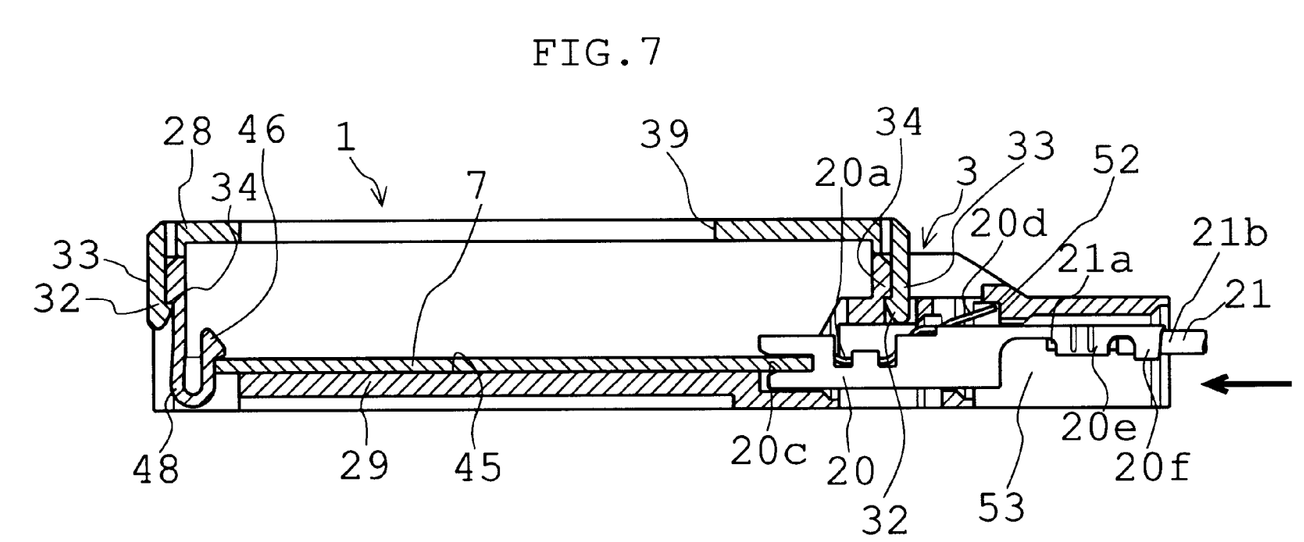
FIG. 7 is a sectional view along line D—D in FIG. 5.
Figure 8:
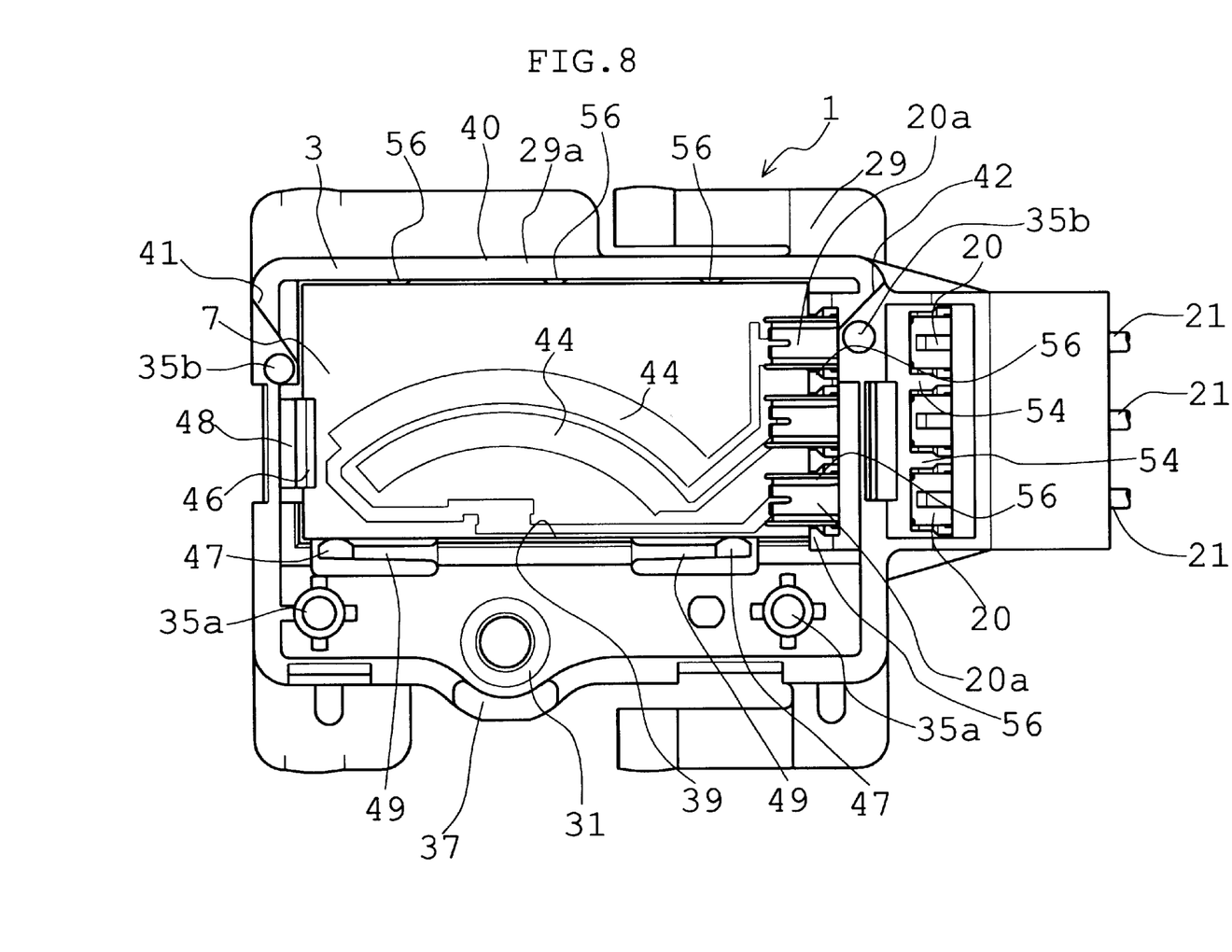
FIG. 8 is a top view of a state in which an upper frame and an arm holder of the embodiment are taken off.

In the connection of the terminals 20 and the circuit board 7, the circuit board 7 is mounted on the lower frame 29 in advance, and the terminals 20 are inserted in the terminal housing portion 53 provided at the lower frame 29 in the direction of an arrow in FIG. 7. By this, the connection can be easily made without using solder, the labor of working can be reduced, and the inexpensive liquid level detecting apparatus can be provided.

By the above structure, the bearing portions 30 and 31 for receiving the shaft portions 24 are respectively provided at the upper and the lower frames 28 and 29, and the float arm 2 and the contact holding member 9 are arranged between the bearing portions 30 and 31, so that the thin type liquid level detecting apparatus 1 as compared with the prior art can be provided. Besides, the shaft portions 24 are separately provided, and both the sides are held by the bearing portions 30 and 31, so that it is possible to obtain the effect that the rotation center of the rotation axis of the arm holder 4 is hard to shift.

INDUSTRIAL APPLICABILITY

The present invention can be applied to a liquid level detecting apparatus, and is particularly suitable for a liquid level detecting apparatus used for a vehicle.

What is claimed is:

1. A liquid level detecting apparatus comprising: a float arm provided with a float floating on a liquid surface; an arm holder for holding the float arm and provided with shaft portions as rotation supporting points of the float arm; a main body frame provided with two bearing portions for axially supporting the shaft portions of the arm holder; a circuit board fixed to the main body frame; and a contact holding member provided with a sliding contact sliding on the circuit board and fixed to the arm holder, characterized in that the arm holder is positioned between the bearing portions and holds the float arm and the contact holding member.

2. A liquid level detecting apparatus comprising: a float arm provided with a float floating on a liquid surface; an arm holder for holding the float arm and provided with shaft portions as rotation supporting points of the float arm; a main body frame for axially supporting the shaft portions of the arm holder; a circuit board fixed to the main body frame; and a contact holding member provided with a sliding contact sliding on the circuit board and fixed to the arm holder, characterized in that the two separate shaft portions are provided at the arm holder, two bearing portions for axially supporting the two shaft portions are provided at the main body frame, and the arm holder holding the front arm and the contact holding member is provided between the bearing portions.

3. A liquid level detecting apparatus comprising: a float arm provided with a float floating on a liquid surface; an arm holder for holding the float arm and provided with shaft portions as rotation supporting points of the float arm; a first frame constituting a main body frame and provided with a first bearing portion for axially supporting a shaft portion of the arm holder; a second frame constituting the main body frame and provided with a second bearing portion for axially supporting another shaft portion of the arm holder; a circuit board fixed to the first frame; and a contact holding member including a sliding contact sliding on the circuit board and fixed to the arm holder, characterized in that the arm holder is held by and between the first and the second frames, and the first and the second frames are fixed.

4. A liquid level detecting apparatus comprising: a float arm provided with a float floating on a liquid surface; an arm holder for holding the float arm and provided with shaft portions as rotation supporting points of the float arm; a main body frame for axially supporting the shaft portions of the arm holder; a circuit board fixed to the main body frame; and a contact holding member provided with a sliding contact sliding on the circuit board and fixed to the arm holder, characterized in that the two separate shaft portions are provided at the arm holder, the main body frame is formed of a first frame and a second frame, the circuit board is fixed to the first frame which is provided with a first bearing portion for axially supporting a shaft portion of the arm holder, the second frame is provided with a second bearing portion for axially supporting another shaft portion of the arm holder, the arm holder is held by and between the first and the second frames, and the first and the second frames are fixed.

5. A liquid level detecting apparatus according to claim 3 or 4, characterized in that the first and the second frames are fixed by welding.

6. A liquid level detecting apparatus according to claim 1, characterized in that a holding arm piece formed to extend in a direction vertical to the axial direction is formed between the shaft portions of the arm holder, and the float arm and the contact holding member are held by the holding arm piece.

7. A liquid level detecting apparatus according to claim 6, characterized in that a bent portion is provided at which an end portion of the float arm is bent in a direction intersecting with the shaft portions, and the arm holder is provided with a holding portion for rotatably holding the end portion and a holding piece for preventing rotation of the float arm.

8. A liquid level detecting apparatus according to claim 7, characterized in that a bending direction of the end portion is substantially orthogonal to the axial direction of the shaft portions.

9. A liquid level detecting apparatus according to claim 1, characterized in that the main body frame is provided with a guide portion for suppressing movement of the float arm in a rotation axis direction.

10. A liquid level detecting apparatus according to claim 3, characterized in that a concave-convex fit portion is provided near the first and the second bearing portions of the first and the second frames.

11. A liquid level detecting apparatus comprising: a float arm provided with a float floating on a liquid surface; an arm holder for holding the float arm and provided with shaft portions as rotation supporting points of the float arm; a first frame constituting a main body frame and provided with a first bearing portion for axially supporting a shaft portion of the arm holder; a second frame constituting the main body frame and provided with a second bearing portion for axially supporting another shaft portion of the arm holder; a circuit board fixed to the first frame; and a contact holding member including a sliding contact sliding on the circuit board and fixed to the arm holder, characterized in that the arm holder is held by and between the first and the second frames, and the first and the second frames are fixed by welding; and characterized in that a rotation regulating portion for regulating a rotation range of the float arm is provided at at least one of the first and the second frames, and a weld fixing portion for welding the first and the second frames is provided near the rotation regulating portion.

12. A liquid level detecting apparatus comprising: a float arm provided with a float floating on a liquid surface; an arm holder for holding the float arm and provided with shaft portions as rotation supporting points of the float arm; a first frame constituting a main body frame and provided with a first bearing portion for axially supporting a shaft portion of the arm holder; a second frame constituting the main body frame and provided with a second bearing portion for axially supporting another shaft portion of the arm holder; a circuit board fixed to the first frame; and a contact holding member including a sliding contact sliding on the circuit board and fixed to the arm holder, characterized in that the arm holder is held by and between the first and the second frames, and the first and the second frames are fixed by welding; and characterized in that the weld fixing portion is a positioning member for determining a positional relation of the first and the second frames.

13. A liquid level detecting apparatus according to claim 3, characterized in that a reinforcing rib is provided at a rear surface of the second frame.

14. A liquid level detecting apparatus comprising:

a float arm provided with a float floating on a liquid surface;

an arm holder for holding the float arm and provided with shaft portions as rotation supporting points of the float arm;

a main body frame for axially supporting the shaft portions of the arm holder;

a circuit board fixed to the main body frame; and a contact holding member provided with a sliding contact sliding on the circuit board and fixed to the arm holder, characterized in that the two separate shaft portions are provided at the arm holder, the main body frame is formed of a first frame and a second frame, the circuit board is fixed to the first frame which is provided with a first bearing portion for axially supporting a shaft portion of the arm holder, the second frame is provided with a second bearing portion for axially supporting another shaft portion of the arm holder, the arm holder is held by and between the first and the second frames, and the first and the second frames are fixed by welding; and characterized in that a rotation regulating portion for regulating a rotation range of the float arm is provided at at least one of the first and the second frames, and a weld fixing portion for welding the first and the second frames is provided near the rotation regulating portion.

15. A liquid level detecting apparatus comprising:
- a float arm provided with a float floating on a liquid surface;
- an arm holder for holding the float arm and provided with shaft portions as rotation supporting points of the float arm;
- a main body frame for axially supporting the shaft portions of the arm holder;
- a circuit board fixed to the main body frame; and
- a contact holding member provided with a sliding contact sliding on the circuit board and fixed to the arm holder,
- characterized in that the two separate shaft portions are provided at the arm holder, the main body frame is formed of a first frame and a second frame, the circuit board is fixed to the first frame which is provided with a first bearing portion for axially supporting a shaft portion of the arm holder, the second frame is provided with a second bearing portion for axially supporting another shaft portion of the arm holder, the arm holder is held by and between the first and the second frames, and the first and the second frames are fixed by welding; and
- characterized in that the weld fixing portion is a positioning member for determining a positional relation of the first and the second frames.

* * * * *